United States Patent [19]
Goldstein

[11] Patent Number: 5,193,744
[45] Date of Patent: Mar. 16, 1993

[54] AUTOMATIC WATER-SPRAY FERTILIZING APPARATUS

[75] Inventor: Gad Goldstein, Tokyo, Japan

[73] Assignee: Trans Global Incorporated, Tokyo, Japan

[21] Appl. No.: 689,561

[22] Filed: Apr. 23, 1991

[30] Foreign Application Priority Data

Jun. 22, 1990 [JP] Japan .................. 2-165354

[51] Int. Cl.⁵ ................. B05B 7/26; A01G 27/00
[52] U.S. Cl. ......................... 239/69; 239/63; 239/304; 239/310
[58] Field of Search ............... 239/304, 307, 63, 727, 239/724, 310, 67, 69

[56] References Cited

U.S. PATENT DOCUMENTS

| | | | |
|---|---|---|---|
| 3,375,976 | 4/1969 | Stamps et al. | 239/310 |
| 3,669,357 | 6/1972 | Overbey | 239/310 |
| 3,910,500 | 10/1975 | Hardison | 239/542 |
| 4,391,390 | 7/1983 | Howard | 239/310 |
| 4,456,176 | 6/1984 | Agius | 239/310 |
| 4,545,396 | 10/1985 | Miller et al. | 239/310 |
| 4,895,303 | 1/1990 | Freyvogel | 239/307 |
| 4,917,304 | 4/1990 | Mazzei et al. | 239/727 |
| 5,021,939 | 6/1991 | Pulgiese | 239/67 |

FOREIGN PATENT DOCUMENTS

| | | | |
|---|---|---|---|
| 0289473 | 5/1991 | Fed. Rep. of Germany | 239/727 |
| 1284456 | 1/1987 | U.S.S.R. | 239/727 |
| 1297765 | 3/1987 | U.S.S.R. | 239/63 |

Primary Examiner—Andres Kashnikow
Assistant Examiner—Christopher G. Trainor
Attorney, Agent, or Firm—Browdy and Neimark

[57] ABSTRACT

The present invention relates to an apparatus controlled by computers, for applicating fertilizers through automatic water-spray in a golf link, farm, garden, indoor garden and flower-vegetable garden on a terrace and roof of a building. The apparatus comprises a storage pump for pumping up water from a water source; filter devices for filtering the thus pumped-up water; injector devices for mixing fertilizers, agricultrual chemicals, bacteria and the like with the water; pressure regulating valves for uniformalizing the pressure of the water mixed with fertilizers and the like in a plurality of branched paths; water-spray devices for spraying the water thus uniformalized in pressure; and a control device for organically controlling the above devices.

1 Claim, 3 Drawing Sheets

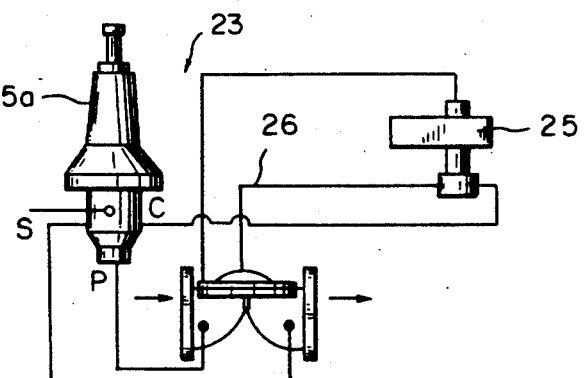
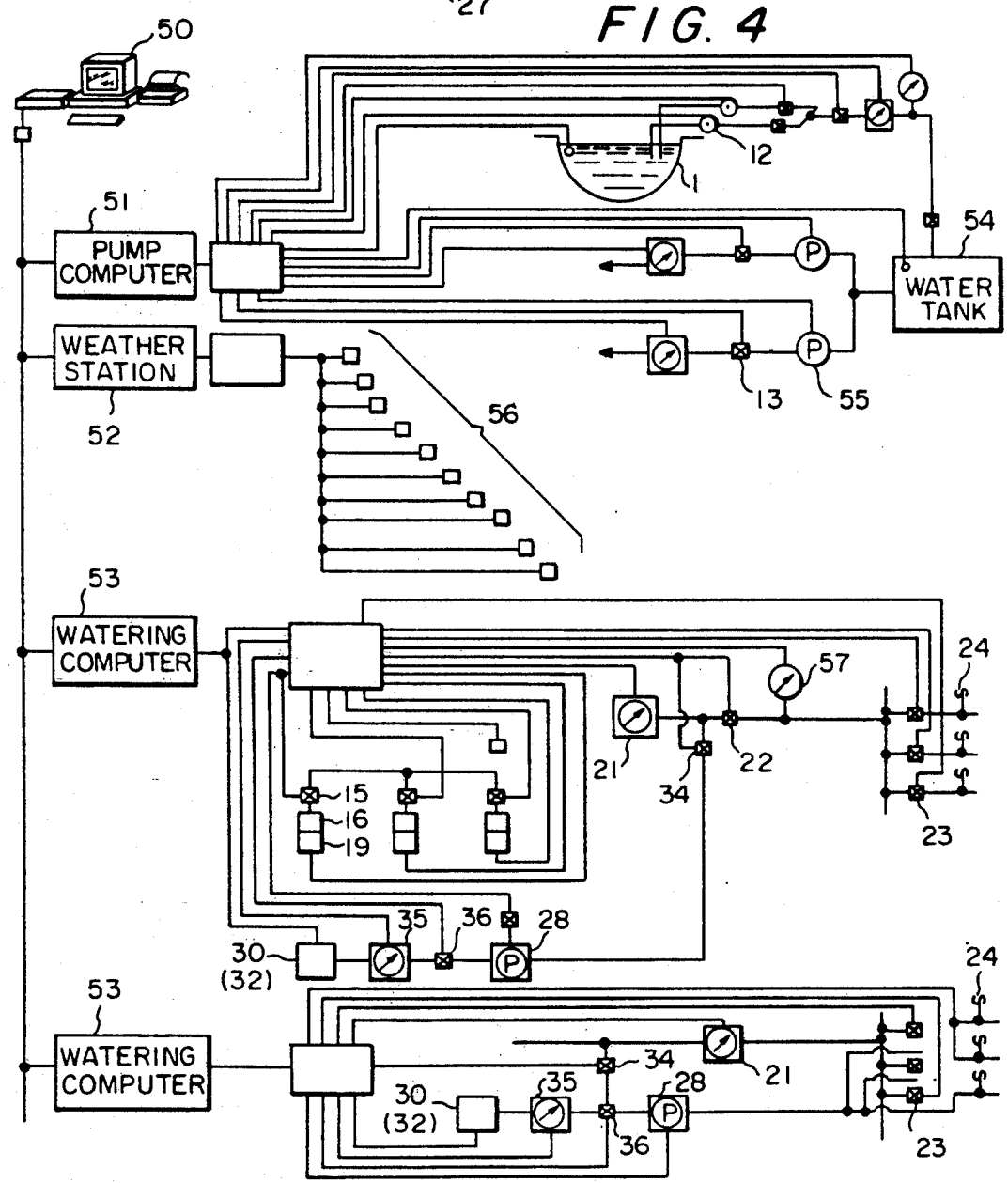

AUTOMATIC WATER-SPRAY FERTILIZING APPARATUS

BACKGROUND OF THE INVENTION

1. Field of the Invention

This invention relates to an apparatus for automatically fertilizing through water-spray under the control of computers in a golf link, farm, garden, indoor garden and flower-vegetable garden on a terrace or roof of a building and the like.

2. Description of the Prior Art

Water-spray systems controlled by computers of various types have heretofore been proposed. Most of the systems are of such an arrangement that the humidity is detected by a sensor embedded in the green of a golf link or the like and, when the humidity thus detected lowers to a predetermined value, sprinklers are operated for a preset period of time (timer system) or until the humidity raises to a preset value.

In recent years, the problems of pollution which seem to be caused by golf links as the sources have been given a great deal of attention. In other words, the fertilizers and agricultural chemicals used in the golf links flow out to contaminate under ground water, rivers and sea, seriously affect the culture of fishes and shells and pollute the waterworks. Reflecting the above-described situation, the administrative authorities began to take the severe actions against the use of the fertilizers and agricultural chemicals in the golf links.

In the conventional water-spray system described above, the control is limited to a mere water-spray and does not come to the problems of the fertilizers and agricultural chemicals described above.

SUMMARY OF THE INVENTION

It is an object of the present invention to provide an automatic water-spray fertilizing apparatus controlled by computers, whereby not only mere water-spray but also application of fertilizers and agricultural chemicals are automatically carried out, the degree of application is controlled, outflow of the fertilizers and agricultural chemicals are suppressed as less as possible, to thereby prevent the pollution from occurring.

It is another object of the present invention to provide a system for effectively utilizing water in ponds and swamps to perform the water-spray fertilizing.

It is a further object of the present invention to provide an automatic water-spray fertilizing apparatus, whereby, even when water is simultaneously sprayed in a plurality of places where differences are presented in height and distance as in the greens of the golf links, water can be sprayed by a constant water pressure, and the amount of water-spray does not become too small in high places and distant places.

It is a still further object of the present invention to provide an automatic water-spray fertilizing apparatus such that the entire apparatus is perfectly monitored by a plurality of master and slave computers and controlled in accordance with the conditions of the weather and the watered places, so that optimal water-supply and application of fertilizers and agricultural chemicals can be always effected.

Other objects and advantages to be brought about by the invention will be apparent from description of the invention with reference to the attached drawings.

The present invention relates to an automatic water-spray apparatus comprising a lift pump for pumping up water from a water source; filter devices for filtering the water thus pumped up; injector devices for mixing fertilizes, agricultural chemicals and bacteria with the water; pressure regulating valves for uniformalizing the pressure of the water mixed with fertilizers and the like in plural branch paths; water-spray devices for spraying the water thus uniformalized in pressure; and a control device for organically controlling the above-described devices. Preferably, reversing valves for opening/closing paths to drain pipes are provided in paths for supplying the water to the filter device so as to backwash the filter device. Furthermore, the control device may include sensors for detecting weather data such as temperatures, humidities, rainfalls, wind speeds and directions, electric conductivity and pH values, and data in the ground.

BRIEF DESCRIPTION OF THE DRAWINGS

FIG. 3 is an explanatory view showing the pressure regulating valve used in this apparatus; and FIG. 4 is a block diagram showing the control device in this apparatus.

DETAILED DESCRIPTION OF THE INVENTION

Figure 1:
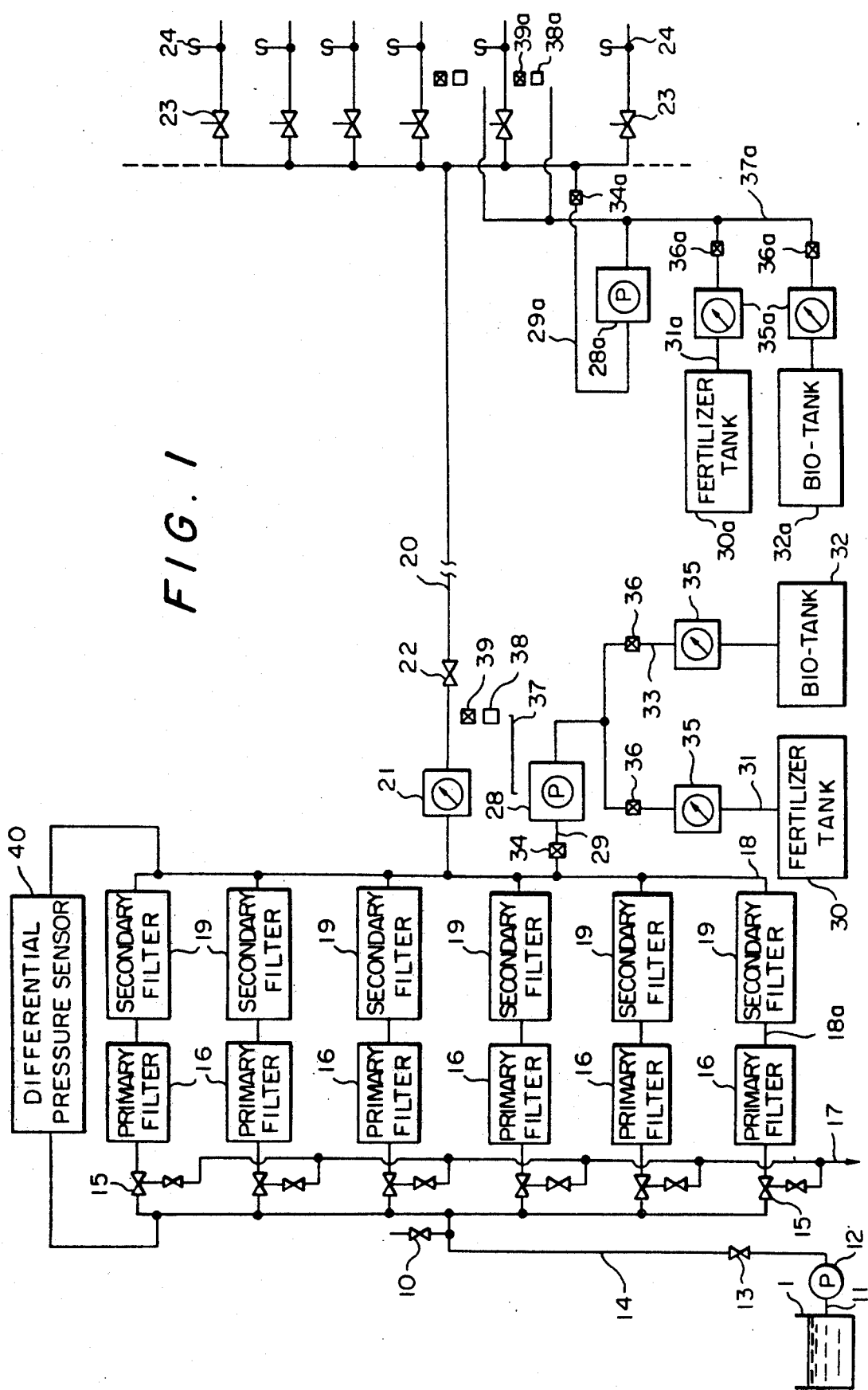
FIG. 1 is a block diagram showing the general arrangement of this apparatus excluding the control device.
Figure 2:
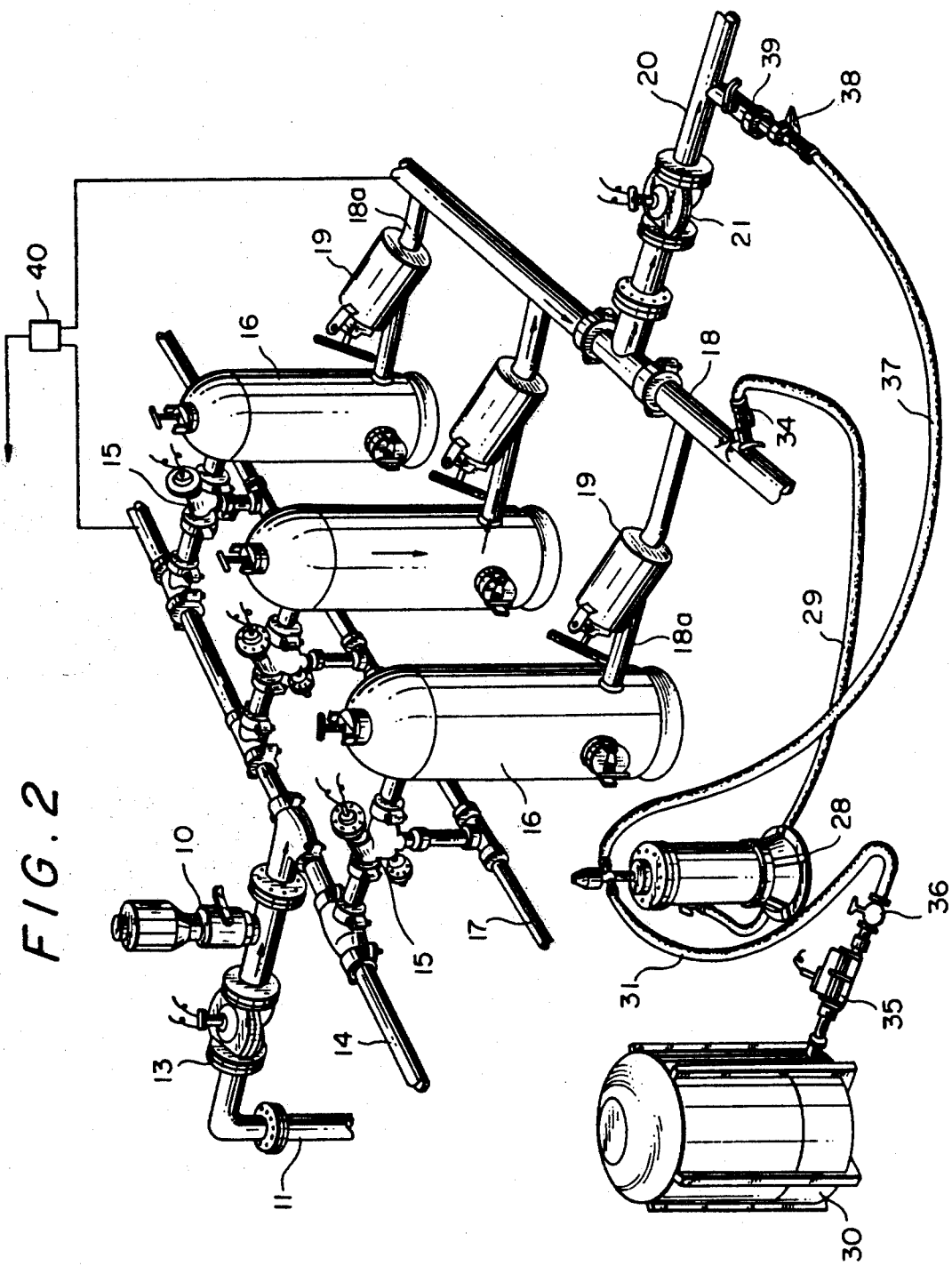
FIG. 2 is a perspective view showing the filter device and the injector device for injecting the fertilizer and the like in an embodiment of this apparatus.

A preferred embodiment of the present invention will hereunder be described with reference to the accompanying drawings.

The system according to the present invention is basically divided into a pump, a filter device, an injector device for injecting fertilizers, agricultural chemicals and the like; a valve device, a water-spray device and a control device for controlling the above devices.

Designated by reference numeral 11 is a lift pipe, one end of which is inserted into a water source 1 such as a pond, river and water storage tank. A lift pump 12 is provided in an intermediate portion of the lift pipe 11 and water is pumped up from the water source 1 by the operation of the lift pump 12. The lift pump 12 is controlled by the control device to pump up only the required amount of water. The other end of the lift pipe 11 is connected to the inlet side of a pump valve 13. A manifold 14 on the inlet side is connected to the outlet side of the pump valve 13. The manifold 14 is branched into a plurality of lines. The end of each of the plurality of lines is further divided into two via a reversing valve 15, one being connected to a top portion of a primary filter 16 and the other connected to a drain pipe 17. Gravel filters are ordinarily used as the primary filter 16. Of course, filters of other types may be used. The ends branches of a manifold 18 on the outlet side are connected to the bottoms of the primary filters 16, and secondary filters 19 are provided in intermediate portions of respective branched pipe 18a. Screen filters or disc filters are ordinarily used as the secondary filters 19, however, filters of other types may be used. Denoted by 10 is an air release valve.

A main pipe 20 extends from the manifold 18 on the outlet side, and a water meter 21 and a main valve 22 are provided in an intermediate portion of the main pipe 20. The main pipe 20 is branched at one end thereof into a plurality of lines, and a water-spray device 24 such as a sprinkler, a trickling hose and the like is secured to each of the ends of the branched lines via a pressure regulating valve 23. FIG. 3 shows an example of the construction of the pressure regulating valve 23. In the drawing, designated by 25 is a solenoid for opening/closing a flow path according to an electric signal from the control device. Denoted by 25a is a pilot, which operates in accordance with the water pressure on the upstream side of a valve, and functions to hold the water pressure on the downstream side at a given value. In other words, when the water pressure on the upstream side is high, a port P and a port C of the pilot 25a are opened and the water pressure is applied to a bypass 26, whereby a diaphragm in a valve chamber is lowered to narrow the flow path. On the contrary, when the water pressure on the upstream side is low, the port P and a port S of the pilot 25aare opened, part of the water is passed through a bypass 27, and directly introduced to the downstream side, whereby the water pressure on the downstream side is raised.

Denoted by 28 is a fertilizer pump driven by the water pressure. Connected to the fertilizer pump are a water tube 29 connected at an end thereof to the manifold 18 on the outlet side, a fertilizer pipe 31 extending from a fertilizer tank 30 and/or a bio tube 33 extending from a bio tank 32 (Refer to FIG. 1). An electromagnetic valve 34 is provided in a portion interconnecting the water tube 29 and the manifold 18 on the outlet side and a required amount of water is taken into the fertilizer pump 28 by the operation of the electromagnetic valve 34, whereby the fertilizer pump 28 is driven. The water used for driving the fertilizer pump 28 is discharged. A flow meter 35 and an electromagnetic valve 36 are provided in each of the fertilizer tube 31 and the bio tube 33, whereby the amount of supply of the fertilizer and the like are checked and the amount of supply of the fertilizer and the like are adjusted. A tube 37 for feeding the fertilizer and the like is connected at its one end to the outlet side of the fertilizer pump 28 and the other end of the tube 37 is connected to the main pipe 20 via the filter 38 and the electromagnetic valve 39. Incidentally, the arrangement of the fertilizer injector device including the above-described fertilizer pump 28, fertilizer tank 30 and the like may be disposed at a water-spray section (Refer to FIG. 1). In this case, the water (serving as the driving source for a fertilizer pump 28a is taken in from a suitable portion of the main pipe 20 and a tube 37a for supplying the fertilizer and the like is branched and the thus branched lines are respectively connected to the water-spray devices 24. When necessary, the devices for injecting fertilizers and the like may be provided at both positions. As for the fertilizer pumps 28 and 28a, various types other than the above may be adopted, not being limited to that of the water pressure type described above.

As other examples of other type, there are an electric pump driven by a motor, a venturi pump using vacuum pressure produced water flow, an electrical-driven dossing pump, and a metering pump can be used.

Denoted 40 is a differential pressure sensor for detecting the difference between the water pressure in the manifold 14 on the inlet side and that in the manifold 18 on the outlet side to provide the data to a computer.

Operation of the above-described construction will hereunder be described. When the lift pump 12 is operated and the pump valve 13 is opened in response to a signal from the computer in the control device, soiled water pumped up from the water source 1 such as the storage tank flows into the multiple branch pipe 14 on the inlet side through the storage pipe 11 and branched, and the flows thus branched flow into the primary filters 16 (At this time, the back-wash valves 15 close the flow paths on the side of the drain pipe 17). The impure water which has entered the primary filters 16 is roughly filtered there and flows out of the branched lines 18a, enters the secondary filters 19, and is passed therethrough so as to be further purified. Part of the water in the manifold 18 on the outlet side passes through the water tube 29 via the electromagnetic valve 34, flows into the fertilizer pump 28 and drives the fertilizer pump 28 to pump up the highly concentrated liquid fertilizer in the fertilizer tank 30. The thus pumped-up liquid fertilizer passes through the tube 37 for supplying the fertilizer and the like, is filtered by the fertilizer 38, and thereafter, flows into the main pipe 20, where the liquid fertilizer is diluted by the water. The flow of the liquid fertilizer thus diluted is branched and the branched flows are set at a given pressure through the respective pressure regulating valves 23, and thereafter, sprayed from the respective water-spray devices 24. On the side of the bio-tank 32, biomaterial and the like are provided in the same manner as above.

The filters in the above mechanism are automatically washed periodically or appropriately. In the illustrated example, automatic washing is performed through the operation of the differential pressure sensor 40. In other words, when foreign matter is accumulated in the filters and the filters are plugged, the flow-out amount is decreased in comparison with the flow-in amount, whereby the water pressure in the manifold 14 on the inlet side is raised and the water pressure in the manifold 18 on the outlet side is lowered. If the difference in water pressure therebetween exceeds a preset value, then the back-wash valves 15 are operated successively in response to signals from the computer, whereby, when the valves 15 close the flow paths on the side of the manifold 14 on the inlet side and open the flow paths on the side of the drain pipe 17, the water in the manifold 18 on the outlet side flows back into the primary filters 16 to back-wash the filters. Accordingly, dust accumulating in the filters is discharged into the drain pipe 17. Such back-washing is successively performed in the respective primary filters 16, so that the filters can avoid plugging and maintain their functions for a long period of time. The back-wash valves 15 may be operated whenever a specific amount of water flows.

FIG. 4 shows the system of the control device. Designated by 50 is a central computer, to which are connected field unit computers such as a pump computer 51 for controlling the operation of the pumps, a weather station 52 for collecting weather data and ground data and a plurality of watering computer 53 for controlling water-spray. The central computer 50 commands these field unit computers. The pump computer 51 controls the operation of the lift pump 12 and the pump valve 13 in accordance with the data from water meters, water pressure gauges and water level gauges so as to constantly secure the water supply at a predetermined amount. In the example shown in FIG. 4, the water from the water source 1 is temporarily pumped up into a water tank 54 by the lift pump 12 so as to store water by a fixed amount, and, water from the water tank 54 is fed to the water-spray devices 24 by a conveying pump 55. The weather station 52 collects the data of air temperature, humidity, rainfall, wind speed, wind directions, and further, the humidity, temperature, pH value, electric conductivity and so forth in the ground and feeds these data to the central computer 50. These data are successively analyzed in the central computer 50 which performs the control of the start/stop of water-spray for the respective water-spray devices, so that the water-spray, application of fertilizers and agricultural chemicals can be always performed under the optimal conditions. For example, when the wind speed is 5 m/sec or more or at the time of rain, water-spray is not performed and, when the rainfall exceeds 3 mm, the program corresponding thereto is carried out. The sprinkling water computer 53 controls the back-wash valves 15 in accordance with the information from the differential pressure sensor 40 and controls the electromagnetic valve 34 in accordance with the information from the flow meter 35 for the liquid fertilizer, to thereby control the operation of the fertilizer pump 28. Further, the central computer 50 controls the main valve 22 in accordance with the information from the water pressure gauge 57.

As was described hereinabove, this apparatus is so constructed that it is monitored and controlled by computers connected to the central computer 50, so as to perform water-spray treatment in accordance with the conditions of the weather and the watered land.

I claim:
1. An automatic water-spray apparatus comprising a water source and a lift pump for pumping water from said water source;
   filter devices for filtering the pumped water having an inlet pipe connected to said lift pump and an outlet pipe extending therefrom through a water metering device;
   differential pressure sensing means connected to said inlet and said outlet pipes of said filter devices;
   backwashing means connected to backwash said filter devices under control of said differential pressure sensing means;
   a central computer for controlling the quantities and timing of spraying of fertilizers, agricultural chemicals and bacteria mixed with the water;
   a pump computer connected to said central computer to control the operation of said lift pump
   a weather station data collection means to collect and feed weather information to said central computer;
   at least one area spray apparatus to spray at least one predetermined area with the water mixed with the fertilizers, agricultural chemicals, and bacteria including
   injector devices for mixing the fertilizers, agricultural chemicals, and bacteria with the water;
   said injector devices including
      storage tanks for the fertilizers, agricultural chemicals, and bacteria;
      a fertilizer pump operated by water from said outlet pipe passing through said fertilizer pump, having an inlet connected in the path of the water downstream of said filter devices and an outlet connected in the path of the water downstream of said water metering device and a second inlet connected to said storage tanks for the fertilizers, agricultural chemicals, and bacteria;
   said at least one area spray apparatus further including a group of sprayers located in each of said at least one predetermined areas to be sprayed for spraying the fertilizers, agricultural chemicals, and bacteria mixed with the water from said injector devices and the water from said water metering device;
   a water distribution slave computer for each of said area spray apparatus connected to said central computer for controlling the distribution of the water to said group of sprayers and controlling the amount of water spray from said group of sprayers in accordance with the area being sprayed by said group of sprayers.

* * * * *